US 6,724,527 B2

(12) United States Patent
Endo et al.

(10) Patent No.: US 6,724,527 B2
(45) Date of Patent: Apr. 20, 2004

(54) OPTICAL AMPLIFIER AND OPTICAL TRANSMISSION SYSTEM USING SAME

(75) Inventors: Shinji Endo, Yokohama (JP); Motoki Kakui, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/954,260

(22) Filed: Sep. 18, 2001

(65) Prior Publication Data

US 2002/0033996 A1 Mar. 21, 2002

(30) Foreign Application Priority Data

Sep. 19, 2000 (JP) ........................................ 2000-283758

(51) Int. Cl.$^7$ .............................................. H04B 10/12
(52) U.S. Cl. ................ 359/337.4; 359/337.5; 359/334; 385/123
(58) Field of Search .................... 359/337.4, 337.5, 359/161, 334; 385/123

(56) References Cited

U.S. PATENT DOCUMENTS

| | | | | |
|---|---|---|---|---|
| 5,612,807 A | * | 3/1997 | Ishikawa et al. ............ | 359/161 |
| 5,831,754 A | * | 11/1998 | Nakano ...................... | 359/127 |
| 5,838,867 A | | 11/1998 | Onishi et al. ................ | 385/123 |
| 5,854,871 A | * | 12/1998 | Akasaka ...................... | 359/161 |
| 5,887,105 A | * | 3/1999 | Bhagavatula et al. ....... | 359/161 |
| 5,905,838 A | * | 5/1999 | Judy et al. .................. | 359/109 |
| 6,154,588 A | * | 11/2000 | Kai ............................. | 359/161 |
| 6,163,398 A | | 12/2000 | Inagaki et al. ............... | 359/341 |
| 6,173,094 B1 | * | 1/2001 | Bowerman et al. ......... | 359/161 |
| 6,266,180 B1 | * | 7/2001 | Inagaki et al. ............... | 359/337 |
| 6,374,027 B1 | * | 4/2002 | Onishi et al. ................ | 359/161 |
| 6,404,964 B1 | * | 6/2002 | Bhagavatula et al. .......... | 372/6 |
| 6,417,961 B1 | * | 7/2002 | Sun et al. .................... | 359/334 |
| 6,421,490 B1 | * | 7/2002 | Liu ............................. | 385/127 |
| 2003/0016437 A1 | * | 1/2003 | Islam et al. .................. | 359/334 |

FOREIGN PATENT DOCUMENTS

| | | |
|---|---|---|
| JP | 10-39155 | 2/1998 |
| JP | 11-237520 | 8/1999 |
| WO | WO 99/57822 | * 11/1999 |
| WO | WO00/74184 | 7/2000 |

OTHER PUBLICATIONS

F.A. Flood. "L–Band Erbium–Doped Fiber Amplifiers." OFCC 2000; Mar. 2000, pp. 102–104.*
Kakui et al. "Long–Wavelength–Band Optical Amplifiers Employing Silica–Based Erbium Doped Fibers Designed for Wavelength Division Multiplexing Systems and Networks." IEICE Trans. Electron. vol. E83–C, No. 6, Jun. 2000, pp. 799–815.*
"High Output Polarization Maintaining Dispersion Shifted EDFA" Yoshio Tashiro et al., The Institute of Electronics, Information and Communication Engineers, General Meeting C–330 (1996).
"High Concentration Er–Doped Fiber for Efficient L–Band Amplification with Short Length" S. Endo et al., OECC 1999, pp. 1356–1357.

* cited by examiner

Primary Examiner—Thomas G. Black
Assistant Examiner—Stephen Cunningham
(74) Attorney, Agent, or Firm—McDermott, Will & Emery

(57) ABSTRACT

Disclosed are an optical amplifier and an optical transmission system using the same in which not only can the dispersion of optical waveguide paths for optical amplification be easily and sufficiently compensated, but also the waveform degradation of signal light can be restrained. An optical amplifier according to one embodiment of the present invention comprises at least two erbium-doped fibers 10 and 20, having erbium doped to optically amplify signal light with the pump light, and having dispersion different from each other in sign, and being connected together in series, and two pump light sources 11 and 12 for supplying pump light to them.

13 Claims, 4 Drawing Sheets

OPTICAL AMPLIFIER AND OPTICAL TRANSMISSION SYSTEM USING SAME

BACKGROUND OF THE INVENTION

1. Field of the Invention

The present invention relates to an optical amplifier that optically amplifies signal light by pump light, using an optical waveguide path to which a fluorescent material is doped, and to an optical transmission system using such optical amplifier.

2. Related Background Arts

An optical amplifier optically amplifies signal light transmitted through an optical transmission line such as an optical fiber transmission line in an optical transmission system to compensate transmission loss in the optical transmission line. The optical amplifier installed on an optical transmission line is equipped with an optical waveguide path such as an optical fiber for optical amplification and an exciting means for supplying pump light to the optical waveguide path for optical amplification. When signal light is input from the upstream side of the optical transmission line to the optical wave guide path for optical amplification to which pump light is supplied, the input signal light is optically amplified through the optical waveguide path for optical amplification and is output to the downstream. Such an optical amplifier includes a rare-earth element doped fiber amplifier, wherein an optical fiber to which rare-earth element is added is used as the optical waveguide path for optical amplification. For example, there is an erbium-doped fiber amplifier (EDFA) using, as an optical waveguide for optical amplification, an erbium-doped fiber (EDF) in which erbium (Er) is doped. An optical amplifier is modularized to be provided in a repeater station of an optical transmission system.

An EDFA can optically amplify signal light in the 1.55 $\mu$m wavelength band (C-band), which is the spectrum band that exhibits the lowest loss of an optical fiber, and also can simultaneously amplify signal light of multi-wavelengths within an amplification spectrum band. Therefore, such an optical fiber amplifier is widely used as an optical amplifier applied to a wavelength division multiplexing (WDM) transmission system. Demands for such amplifiers are expected to increase further in the future.

In the above-mentioned structure where the 1.55 $\mu$m wavelength band is the amplification spectrum band for the optical fiber amplifier, the fiber length needed for optical amplification is about 10 to 30 m. Thus, desired gain can be attained with a comparatively short fiber length. The dispersion in the optical fiber for optical amplification itself is hardly a problem because not only is the wavelength range of signal light comparatively narrow, but also there is a dispersion compensating fiber which exhibits zero dispersion in the vicinity of the 1.55 $\mu$m wavelength. In order to meet the desire to suppress even low dispersion to a possible minimum level so as to speed up optical communication, an EDF having a zero dispersion wavelength in the 1.55 $\mu$m wavelength was examined (See the reference literature: The Institute of Electronics, Information and Communication Engineers, General Meeting C-330 (1996)).

On the other hand, the demands for an optical amplifier using the 1.58 $\mu$m wavelength band in which flat gain is possible in a wide wavelength range have increased rapidly in recent years. If an EDF used for optical amplification in the 1.55 $\mu$m wavelength band is employed in an optical fiber amplifier for the 1.58 $\mu$m wavelength band, the fiber length needed will be as long as 100 m to 120 m. In the case of using a specially designed EDF for optical amplification in the 1.58 $\mu$m wavelength band (See the reference literature: OECC '99, pp1356–1357 (1999)), the required fiber length will be about 50 m to 60 m.

The required fiber length can be shortened to some extent by increasing the concentration of Er added to an EDF, but there is a limit. Therefore, the dispersion characteristics of an EDF itself become a problem in the case of optical amplification in the 1.58 $\mu$m wavelength band because dispersion is accumulated in the optical amplifier by signal light being transmitted in a long length EDF.

In order to overcome such problem, a structure is considered such that a device for dispersion compensation is connected to an EDFA so that dispersion in an optical transmission system as a whole may be compensated. In such a structure, however, there occur problems, such as connection loss and the deterioration of the noise figure, which are caused by connecting such dispersion-compensating device to an optical fiber. This becomes disadvantageous particularly in terms of increasing the number of wavelengths and the transmission speed in a WDM transmission system.

Japanese Patent Application Laid-Open No. 10-39155 and Japanese Patent Application Laid-Open No. 11-237520 disclose inventions in which optical amplification and dispersion compensation are performed simultaneously by adding a rare-earth element at a low concentration to a dispersion compensating fiber (DCF). However, in such a structure, it is difficult to make the required lengths of the respective fibers to coincide with each other. Because it is impossible to choose such length of fiber as to decrease the wavelength dependence of gain of the optical amplifier, a gain-flattening filter becomes necessary, and designing such a gain equalization filter is difficult. Also, in a dispersion compensating fiber, because $\Delta n$ (the relative refractive index difference) of the core is great and the effective area ($A_{eff}$) is small, four-wave mixing (FWM) and cross-phase modulation (XPM) tend to occur easily. When these phenomena occur, thereby noise light is generated, and the waveform of signal light is degraded.

SUMMARY OF THE INVENTION

An object of the present invention is to provide an optical transmission system as well as an optical amplifier in which dispersion in the optical waveguide paths for optical amplification is easily and sufficiently compensated, and at the same time the waveform degradation of signal light is restrained.

In order to achieve this object, the optical amplifier is equipped with at least two optical waveguide paths connected in series which are doped with a fluorescent material to optically amplify signal light by pump light and which have dispersion different from each other in sign. The optical amplifier is also equipped with one or more exciting means that supply pump light to each of the optical waveguide paths described above.

In one embodiment of the present invention, overall chromatic dispersion in the whole optical amplifier may be zero at least in one wavelength of the spectrum band in which the optical amplifier has gain, and at least part of the spectrum band in which the optical amplifier has gain may be included in the L band. Also, at least one of the optical waveguide paths may be an EDF having dispersion equal to or less than $-10$ ps·nm$^{-1}$·km$^{-1}$ at the wavelength of 1580 nm, or an EDF having dispersion equal to or more than 5 ps·nm⁻¹·km⁻¹ at the wavelength of 1580 nm. In the present invention, the wavelength range of 1570 nm to 1605 nm is referred to as "L band".

Also, the optical transmission system is equipped with at least two optical waveguide paths connected in series which are doped with a fluorescent material to optically amplify signal light by pump light and which have dispersion different from each other in sign. The optical transmission system is also equipped with one or more exciting means that supply pump light to each of the optical waveguide paths described above.

The above and further objects and novel features of the invention will be more fully clarified from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENT

Figure 1:
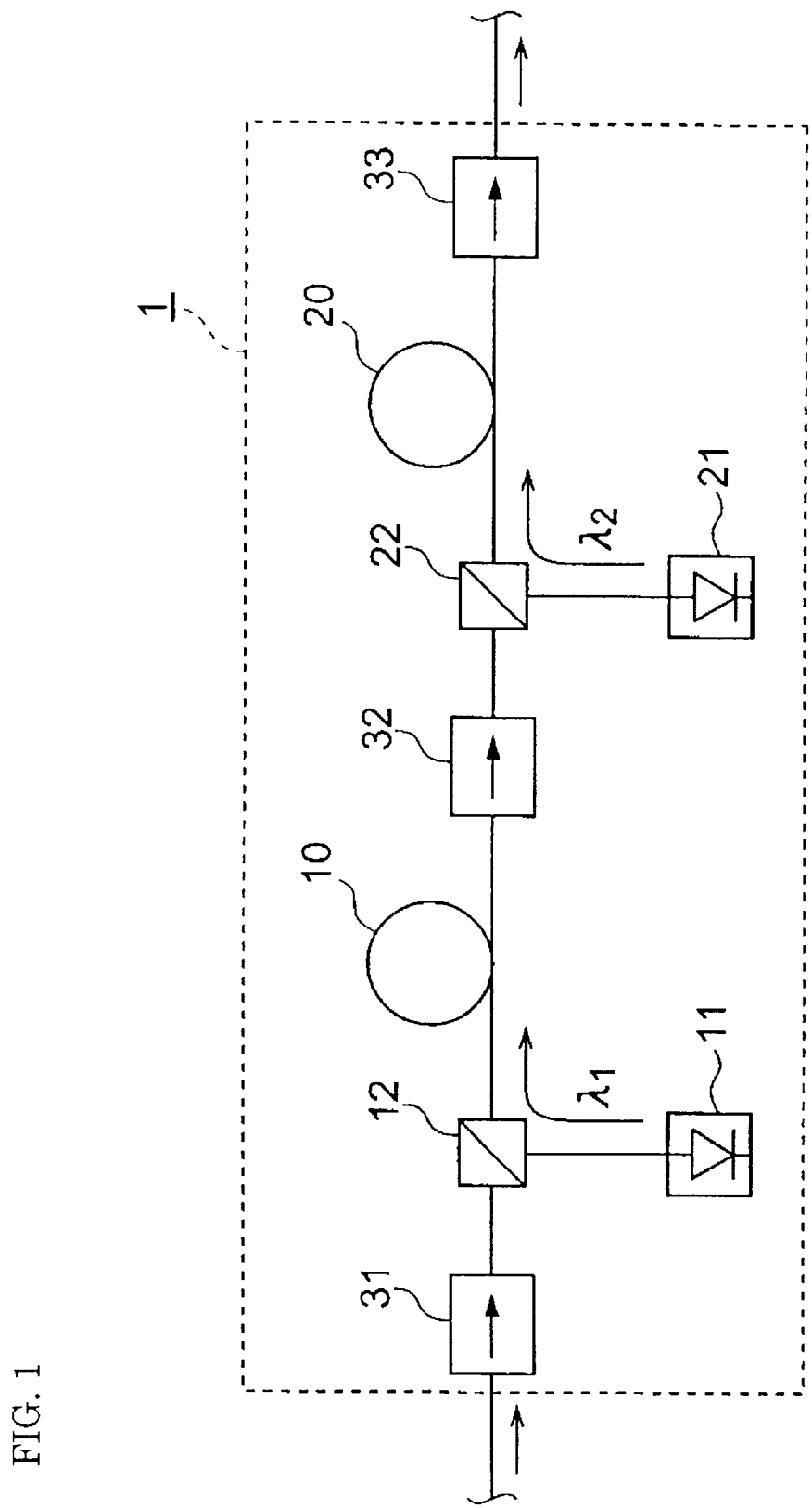
FIG. 1 is a schematic diagram showing an EDFA according to the first embodiment of the present invention.

In the following, the preferred embodiments of the present invention will be explained in detail with reference to the accompanying drawings. To facilitate the comprehension of the explanation, the same reference numerals denote the same parts, where possible, throughout the drawings, and a repeated explanation will be omitted. The dimensions in the drawings are partly exaggerated and do not always correspond to actual ratios of dimensions.

FIG. 1 is a schematic diagram showing an EDFA according to the first embodiment of the present invention. The EDFA 1 is equipped with two optical fibers, EDFs 10 and 20, as a plurality of optical waveguide paths forming an optical transmission line in the optical amplifier. Moreover, EDFA 1 is equipped with pump light sources 11 and 21, WDM couplers 12 and 22, and three optical isolators 31, 32, and 33.

The EDFs 10 and 20 are silica-based optical fibers that are respectively doped with a rare-earth element, Er, as a fluorescent material to optically amplify signal light. The EDFs 10 and 20 optically amplify and output the input signal light that is within a pre-determined amplification spectrum band when pump light having a given wavelength is supplied thereto. Also, the EDF 10 and EDF 20 have dispersion that is not zero and is different from each other in sign, and they are connected together in series in the order of the EDF 10 and EDF 20 in the transmission direction of signal light so as to form an optical transmission line in the EDFA 1.

Optical isolators 31, 32, and 33 limit the transmission direction of signal light transmitted in the optical transmission line in the EDFA 1. That is, the optical isolator 31 allows light, which has reached it from the signal light input of the EDFA 1, to pass to the EDF 10, but it does not allow the light to pass in the opposite direction. Also, the optical isolator 32 allows the light, which has reached it from the EDF 10, to pass to the EDF 20, but it does not allow the light to pass in the opposite direction. Similarly, the optical isolator 33 allows the light, which has reached from the EDF 20, to pass toward the signal light output of the EDFA 1, but it does not allow the light to pass in the opposite direction.

An exciting means, the pump light source 11, supplies pump light to the EDF 10, which is the upstream optical fiber for optical amplification. The pump light source 11 is connected to the optical transmission line through the WDM coupler 12. The WDM coupler 12 allows the pump light of a given wavelength $\lambda_1$, which has been output from the pump light source 11 and has reached it, to pass to the EDF 10, and it also allows signal light, which has reached it from the optical isolator 31, to the EDF 10. Thus, the upstream part including the EDF 10 of the EDFA 1 is structured for forward excitation (excitation in the forward direction).

Also, an exciting means, the pump light source 21, supplies pump light to the EDF 20 which is an optical fiber for optical amplification located downstream. The pump light source 21 is connected to the optical transmission line through the WDM coupler 22. The WDM coupler 22 allows pump light of a given wavelength $\lambda_2$, which has been output from the pump light source 21 and has reached it, to pass to the EDF 20, and it also allows signal light, which has reached it from the optical isolator 32, to pass to the EDF 20. Thus, the downstream part including the EDF 20 of EDFA 1 is structured for forward excitation (excitation in the forward direction).

Under this condition, the signal light that is input through the optical isolator 31 from the optical transmission line connected to the signal light input of the EDFA 1 is optically amplified in the EDF 10 located upstream, and then is output toward the optical isolator 32. Moreover, the signal light that has been optically amplified in the EDF 10 is optically amplified further in the EDF 20 located downstream, and then is output from the signal light output through the optical isolator 33.

In the EDFA 1 of the present embodiment, the optical transmission line within the EDFA 1 is not made of a single EDF, but is formed by cascade-connecting the EDF 10 and EDF 20 together, both having dispersion that is not zero and is different from each other in sign. Thus, it is possible to easily make optical amplification and dispersion compensation compatible in the EDF because it is not each individual EDF, but the combination of the EDF 10 and EDF 20, that controls the dispersion of the whole EDFA 1.

Therefore, facilitating the compatibility of optical amplification and dispersion compensation is possible by using a usual optical waveguide path for optical amplification, without adopting a complicated structure of the EDFA, such as applying a waveguide path structure for dispersion compensation to an optical waveguide path for optical amplification. Also, because it is unnecessary to connect a dispersion compensating device or the like, there occurs no waveform degradation of signal light, which would otherwise be caused by connection loss and the resultant deterioration of the noise figure.

On the other hand, in an EDFA made by using a single EDF, the dispersion of the EDF becomes the dispersion of the whole optical transmission line of the EDFA. In such EDFA, in order to make optical amplification and dispersion compensation be compatible, it is necessary to control the dispersion of the EDF itself, or to connect a dispersion compensating device or the like thereto. Then, the structure of the EDFA, etc. becomes complicated, and the noise figure is degraded because the waveform degradation of signal light occurs or the intensity of signal light decreases. Also, it is difficult to make optical amplification and dispersion compensation be fully compatible.

Preferably, the dispersion of the EDFs 10 and 20 and the fiber length are set such that the overall chromatic dispersion in the whole optical transmission line as accumulated in the EDFs 10 and 20 becomes zero at least at one wavelength in the amplification spectrum band of the EDFA 1. Then, the overall chromatic dispersion of signal light at each wavelength in the amplification spectrum band can be made sufficiently small. Also, the waveform degradation of signal light caused by light source chirping and self-phase modulation (SPM) due to great dispersion is restrained.

Also, preferably, an EDFA is structured such that at least part of the amplification spectrum band is included in the L band. In optical amplification in such L band, a long length EDF is needed as compared with the case of optical amplification in the 1.55 $\mu$m wavelength band (C-band) so as to sufficiently secure the amplification efficiency of optical amplification as described above. Therefore, the overall chromatic dispersion accumulated in the whole optical transmission line in the EDFA particularly becomes a problem.

On the other hand, in the EDFA 1 of the present embodiment which is equipped with the EDFs 10 and 20, the overall chromatic dispersion in the optical transmission line itself, which is formed by an optical waveguide path for optical amplification, can be made to fall within a preferable numerical value range while amplification characteristics are satisfied, even in the case where the fiber length in the EDFA 1 is long. That is, in the structure of the EDFA 1 as described above, it is possible to make optical amplification and dispersion compensation be easily and sufficiently compatible not only in the 1.55 $\mu$m wavelength band, but also in the 1.58 $\mu$m wavelength band where it has been difficult to achieve in the past.

In this case, the absolute magnitude of dispersion of the whole EDFA 1 as accumulated in the EDFs 10 and 20 at least in part of the amplification spectrum band which is included in the L band is preferably equal to or less than 0.5 ps·nm$^{-1}$. Then, the waveform degradation of signal light caused by light source chirping and SPM due to great dispersion can be restrained with respect to all signal light wavelengths in the L band.

Moreover, it is preferable that the absolute magnitude of overall dispersion slope in the whole optical transmission line as accumulated in the EDFs 10 and 20 at least in a part of the amplification spectrum band included in the L band is equal to or less than 0.03 ps·nm$^{-2}$. By reducing differences in the transmission time among signal light wavelengths, a wider wavelength range can be used for optical amplification as well as light transmission.

Figure 2:
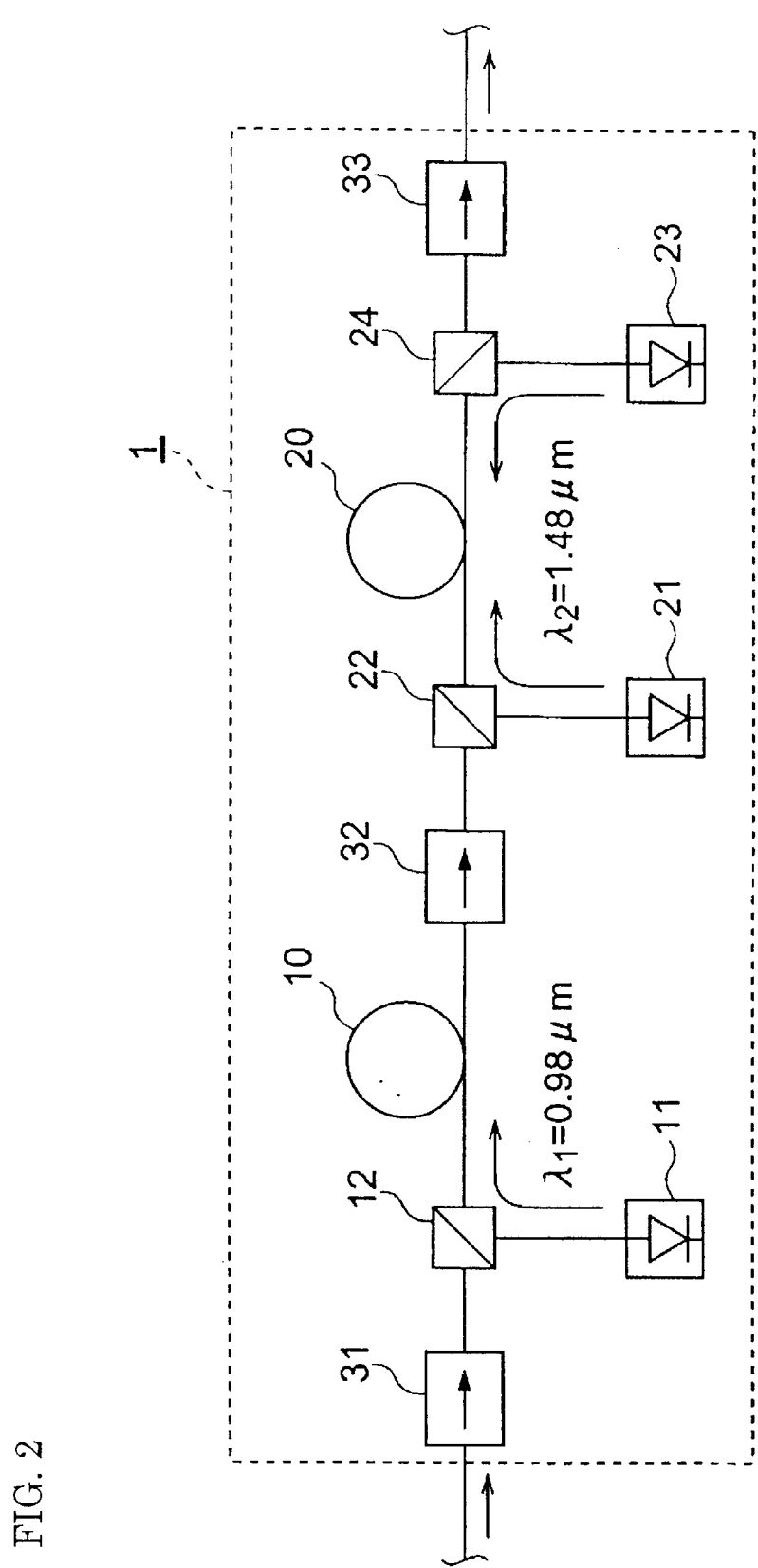
FIG. 2 is a schematic diagram showing an EDFA according to the second embodiment of the present invention.

FIG. 2 is a schematic diagram showing an optical amplifier, EDFA, according to the second embodiment of the present invention. In this embodiment, a pump light source 23 is provided in addition to the pump light source 21 as an exciting means for supplying the EDF 20 with pump light. The pump light source 23 is connected to the optical transmission line through a WDM coupler 24. The WDM coupler 24 allows pump light having a given wavelength $\lambda_2$, which has been output from the pump light source 23 and has reached it, to pass toward the EDF 20. The WDM coupler 24 also allows signal light, which has reached it from the EDF 20, to pass toward the optical isolator 33. The downstream part of the EDFA 1 including the EDF 20 is structured for bidirectional excitation, that is, pumping is done both upstream and downstream, because of the pump light source 23 and the pump light source 21.

In this structure, pump light having wavelength $\lambda_1$ and pump light having wavelength $\lambda_2$ are supplied to the EDFs 10 and 20 respectively, from the pump light sources 11, 21, and 23. When signal light is input under this condition through the optical isolator 31 from the optical transmission line connected to the input side of the EDFA 1, the signal light is optically amplified first in the EDF 10 located upstream and is then output toward the optical isolator 32. Furthermore, the signal light that has been optically amplified in the EDF 10 is optically amplified further in the EDF 20 located downstream, and is output from the signal light output through the optical isolator 33.

A further detailed explanation about the structure of the EDFA 1 according to the present embodiment will be given below. In the EDFA 1 shown in FIG. 2, the dispersion at the 1580 nm wavelength of the EDF 10 located at the preceding stage (the upstream side) is a negative dispersion value equal to or less than $-10$ ps·nm$^{-1}$·km$^{-1}$, and the cutoff wavelength $\lambda$c is equal to or less than 980 nm. Such EDF can be used as an optical waveguide path having a negative dispersion value in the combination of the plurality of optical waveguide paths as described above.

That is, the dispersion value of the EDF 10 is set to satisfy the negative numerical value within the range set forth above by decreasing the core diameter of the EDF 10 and setting the cutoff wavelength equal to or less than 980 nm. Also, the upstream part of EDFA 1 including the EDF 10 is structured for 0.98 $\mu$m forward excitation by setting the wavelength $\lambda_1$ of pump light to be within the 0.98 $\mu$m wavelength band corresponding to such EDF 10.

On the other hand, the dispersion at the 1580 nm wavelength of the EDF 20 located at the succeeding stage (the downstream side) is a positive dispersion value equal to or more than 5 ps·nm$^{-1}$·km$^{-1}$, and the cutoff wavelength $\lambda$c is 1300 nm or more. Such EDF can be used as an optical waveguide path having a positive dispersion value in the combination of the plurality of optical waveguide paths as described above.

That is, the dispersion value of the EDF 20 is set to a positive dispersion value to meet the numerical value condition set forth above by increasing the core diameter of the EDF 20 and setting a cutoff wavelength equal to or more than 1300 nm. Also, the downstream part of the EDFA 1 including the EDF 20 is structured for 1.48 $\mu$m bidirectional excitation by setting the wavelength $\lambda_2$ of pump light to be within the 1.48 $\mu$m wavelength band corresponding to such EDF 20.

In the EDFA 1 according to the present embodiment, as described above, the upstream part of the EDFA 1 including the EDF 10 is structured for 0.98 $\mu$m forward excitation, whereas the downstream part except for the most upstream side is structured for 1.48 $\mu$m bidirectional excitation. In the optical amplification by 0.98 $\mu$m wavelength excitation, noise figure is comparatively low, and the occurrence of noise light can be reduced. Therefore, the noise characteristics of the optical transmission line of the EDFA 1 as a whole can be improved because the noise light generated in the EDF 10 is prevented from being optically amplified in other EDF (the EDF 20 in FIG. 2) located downstream.

Also, the EDF 20 and the pump light sources 21 and 23 which perform optical amplification by 1.48 $\mu$m wavelength excitation are disposed downstream of the EDF 10 in the downstream points except for the most upstream part of the optical transmission line within the EDFA 1. Therefore, it is possible to perform optical amplification more efficiently in the EDFA 1 as a whole, including optical amplification by the upstream EDF 10, and thereby to increase output signal light. Also, it is possible to improve the overall noise characteristics of the optical transmission line in the EDFA 1 as a whole by disposing the EDF 10 at the upstream side, and the EDF 20 at the downstream side.

Preferably, the ratio of Er added to the EDF 10 for 0.98 µm forward excitation is in the range of 500 ppm to 1500 ppm ("ppm" is "weight ppm"). Then, the efficiency of optical amplification in the EDF 10 having a negative dispersion value can be improved by such Er concentration.

Also, preferably, the ratio of Er added to the EDF 20 for 1.48 µm bidirectional excitation is in the range of 1000 ppm to 3000 ppm. Then, by providing such a high Er concentration, it is possible to increase the efficiency of optical amplification in the EDF 20 having a positive dispersion value and thereby decreasing the length of the optical transmission line of the EDFA 1 as a whole. Also, in the present embodiment, by composing the EDF 20 to perform bidirectional excitation by means of pump light sources 21 and 23, the power of output signal light is further increased by the increased output power of pump light.

Next, an explanation of a concrete example of the EDFA employing the structure of the second embodiment shown in FIG. 2 will be given below. As for the EDF 10 for 0.98 µm forward excitation, the EDF length was 20 m, gain at the 1.53 µm wavelength, $\alpha_{1.53}$, was 6.0 dB·m$^{-1}$, a cutoff wavelength $\lambda c$ was 0.95 µm, the relative refractive index difference $\Delta n$ of the core was 1.3% ($\Delta n=0$ for pure silica), the dispersion at the 1.58 µm wavelength was −20 ps·nm$^{-1}$·km$^{-1}$, and the dispersion slope at the 1.58 µm wavelength was 0.07 ps·nm$^{-2}$·km$^{-1}$. Also, a laser diode (LD) for the 0.98 µm wavelength band was used as the pump light source 11.

On the other hand, in the EDF 20 for 1.48 µm bidirectional excitation, the EDF length was 36 m, gain at the 1.53 µm wavelength, $\alpha_{1.53}$, was 16.0 dB·m$^{-1}$, cutoff wavelength A c was 1.45 µm, the relative refractive index difference A n of the core was 1.4%, the dispersion at the 1.58 µm wavelength was 10 ps·nm$^{-1}$·km$^{-1}$, and the dispersion slope at the 1.58 µm wavelength was 0.03 ps·nm$^{-2}$·km$^{-1}$. Also, LDs for the 1.48 µm wavelength band are used as the pump light sources 21 and 23.

Also, an optical multiplexer/demultiplexer for 0.98 µm/1.58 µm wavelengths was used as the WDM coupler 12. An optical multiplexer/demultiplexer for 1.48 µm/1.58 µm wavelengths was used as the WDM couplers 22 and 24.

Figure 3:
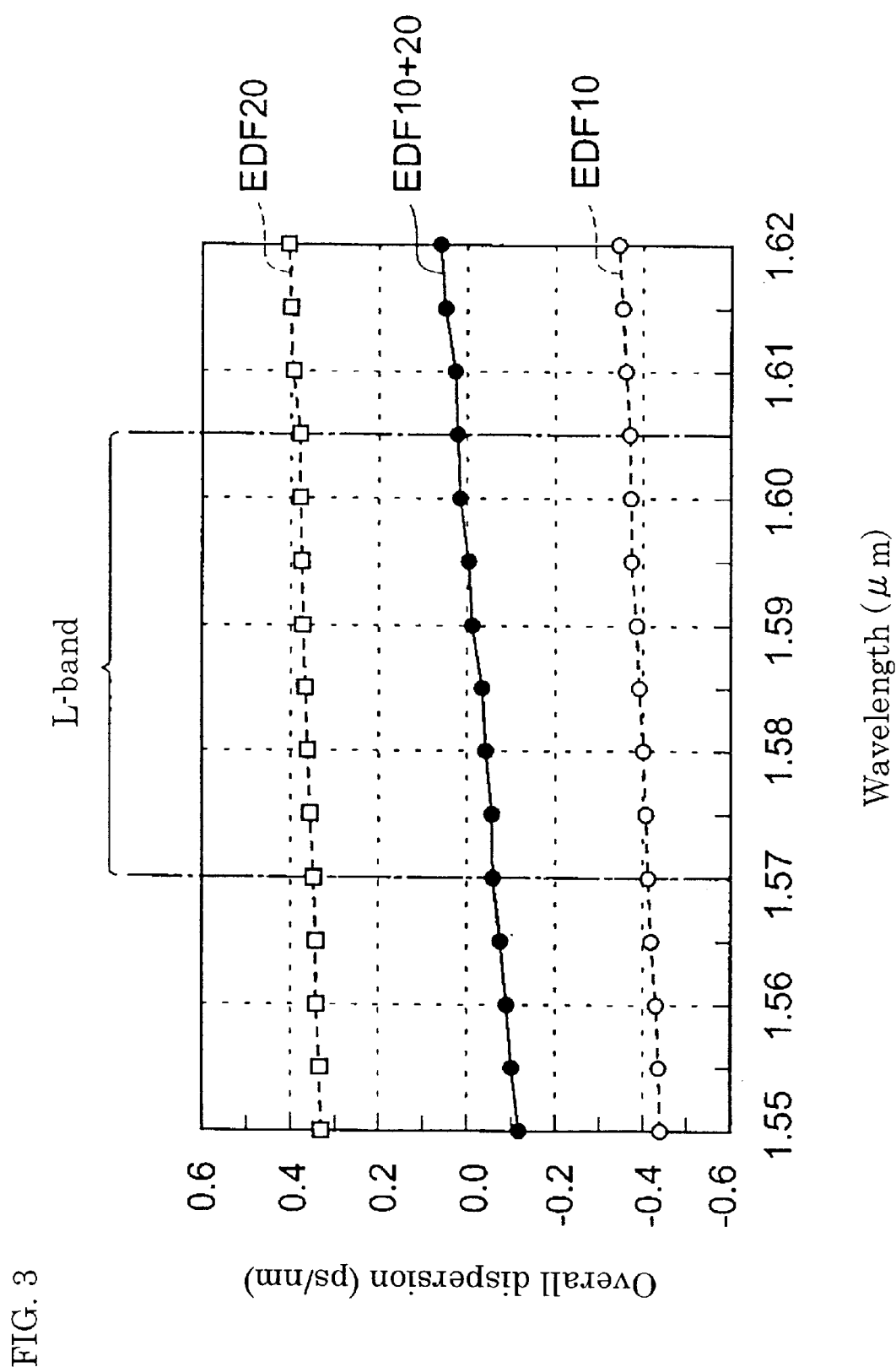
FIG. 3 is a graph showing the signal light wavelength dependence of overall chromatic dispersion in the EDFA of the second embodiment according to the present invention.

FIG. 3 shows the signal light wavelength dependence of the dispersion with respect to the EDF 10 located upstream, the EDF 20 located downstream, and the whole optical transmission line consisting of the EDF 10 and the EDF 20, respectively, in the EDFA 1 having the above-described structure. In this graph, the abscissa shows the wavelength (µm) of signal light to be optically amplified, and the ordinate shows the accumulated overall chromatic dispersion (ps·nm$^{-1}$). Also, the signal light wavelength range between the dot-and-dash lines in FIG. 3 indicates the above-mentioned L band.

In this structure, the EDFA 1 can perform optical amplification of 32 ch in the case where the input power of input signal light is −20 dB and the output power of output signal light after the optical amplification is +5 dB.

As for the dispersion compensation in the EDFA 1, the accumulated overall chromatic dispersion in the whole optical transmission line in the EDFA 1 was −0.04 ps·nm$^{-1}$ at the 1.58 µm wavelength, which was satisfactorily small overall chromatic dispersion, the dispersion being sufficiently compensated. Also, the overall chromatic dispersion in the L band was in the range of −0.07 ps·nm$^{-1}$ to 0.03 ps·nm$^{-1}$, and the overall chromatic dispersion was small with respect to all signal light wavelengths included in the L band. Also, the zero dispersion wavelength in which the overall chromatic dispersion becomes zero was 1.596 µm, and the overall dispersion slope at the 1.58 µm wavelength was 0.0025 ps·nm$^{-2}$.

As described above, in the EDFA 1 in this example, the optical amplification and the dispersion compensation of the EDF 10 and the EDF 20 were sufficiently compatible. In particular, the EDFA 1 enables the 1.58 µm wavelength band to be used as an amplifying spectrum band in a state where optical amplification and dispersion compensation are favorably compatible.

Figure 4:
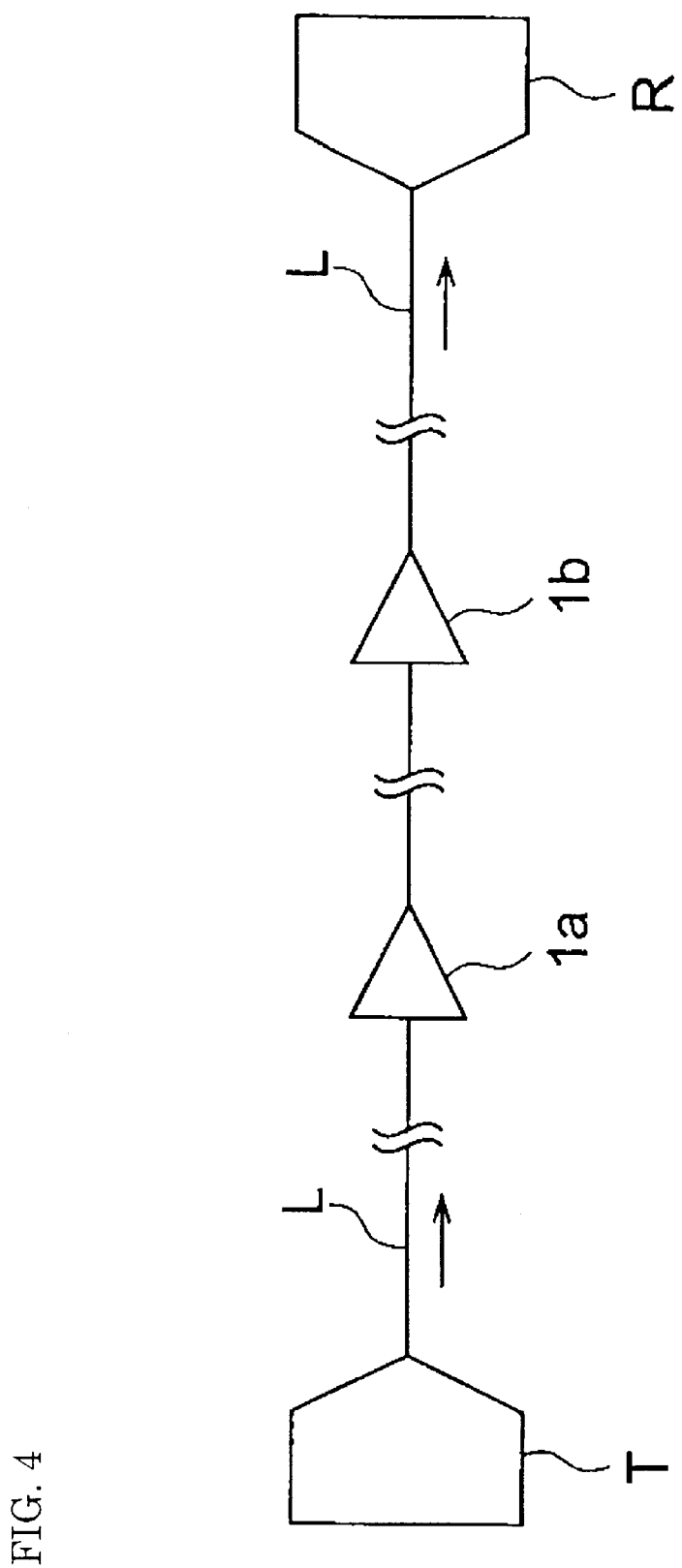
FIG. 4 is a schematic diagram showing one embodiment of the optical transmission system according to the present invention.

Next, an explanation is given about an optical transmission system using an EDFA having the above-described structure of the present invention. FIG. 4 is a schematic diagram showing one embodiment of the optical transmission system using the EDFAs shown in FIG. 1 or FIG. 2.

In the optical transmission system of the present embodiment, an optical fiber transmission line L composed of the optical waveguide paths in which signal light is transmitted is provided between a transmitting station (a transmitter) T and a receiving station (a receiver) R. Then, the optical transmission system is formed by disposing the EDFA 1 shown in FIG. 1 or FIG. 2 (in the case of the structure shown in FIG. 4, two EDFAs; EDFA 1a and EDFA 1b) at predetermined positions on the optical fiber transmission line L. The EDFAs 1a and 1b are respectively installed within a repeater station of the optical transmission system, for example.

Thus, it is possible to decrease dispersion in the EDFA 1 by installing the EDFA 1 of the above-described structure on the optical fiber transmission line L and thereby performing optical amplification. Therefore, it is possible to ignore dispersion in the optical amplifier with respect to the optical transmission line of the whole optical transmission system. Also, the waveform degradation of signal light can be restrained, and an optical transmission system that is able to ensure the transmission of signal light can be obtained.

As for the kinds of optical fibers used for an optical transmission line, the optical amplifier can be suitably applied regardless of the type, such as a dispersion-shifted fiber, or a combination of a single mode fiber and a dispersion compensating fiber,. Therefore, it is possible to easily meet the demands for high bit rate and broadened bandwidth of signal light because low dispersion can be maintained in the optical transmission system by ensuring low dispersion of an optical transmission line itself even in the case where an optical amplifier is connected thereto.

An optical amplifier and an optical transmission system using it according to the present invention are not limited to the embodiments and examples described above, and numerous variations are possible. For example, in the EDFA described above, an optical transmission line in the EDFA is formed by connecting two EDFs, but the number of EDFs is not limited to two; three or more EDFs may be connected in series. Also, a necessary number (one or more) of pump light sources for supplying the EDFs with pump light may be provided according to the wavelength of the pump light and the concrete structural condition of the needed amplification power in each EDF to be connected.

Also, a plurality of optical waveguide paths forming the optical amplifier are not limited to EDFs, and the optical amplifier of the above-described structure may be formed by using various optical waveguide paths for optical amplification, such as optical fibers doped with a rare-earth element other than Er.

What is claimed is:

1. A modularized optical amplifier for use in an optical transmission system, the modularized optical amplifier comprising at least one positive dispersion optical waveguide path having a positive dispersion at the wavelength of 1580 nm, at least one negative dispersion optical waveguide path having a negative dispersion at the wavelength of 1580 nm, and one or more exciting means for supplying pump light to each of said at least one positive dispersion optical waveguide path and at least one negative dispersion optical waveguide path, wherein the cutoff wavelength of said at least one positive dispersion optical waveguide path is equal to or more than 1300 nm, the cutoff wavelength of said at least one negative dispersion optical waveguide path is equal to or less than 980 nm, and said at least one positive dispersion optical waveguide path and said at least one negative dispersion optical waveguide path are connected together in series and doped with a fluorescent material to optically amplify signal light by pump light.

2. An optical amplifier according to claim 1, wherein overall dispersion in the whole optical amplifier becomes zero at least at one wavelength in the spectrum band where said optical amplifier has gain.

3. An optical amplifier according to claim 1, wherein at least part of the spectrum band where said optical amplifier has gain is included in the L band.

4. An optical amplifier according to claim 3, wherein at least in a part of the spectrum band included in the L band where said optical amplifier has gain, the absolute magnitude of the overall chromatic dispersion of said whole optical amplifier is equal to or less than 0.5 ps·nm$^{-1}$.

5. An optical amplifier according to claim 3, wherein at least in a part of the spectrum band included in the L band where said optical amplifier has gain, the absolute magnitude of the overall dispersion slope of said whole optical amplifier is equal to or less than 0.03 ps·nm$^{-2}$.

6. An optical amplifier according to claim 1, wherein said at least one negative dispersion optical waveguide path is an Er-doped optical fiber in which said dispersion at the wavelength of 1580 nm is equal to or less than −10 ps·nm$^{-1}$·km$^{-1}$.

7. An optical amplifier according to claim 6, wherein the concentration of Er in said Er-doped optical fiber is within the range of 500 ppm to 1500 ppm.

8. An optical amplifier according to claim 6, wherein said Er-doped optical fiber is disposed at the most upstream side of said at least one positive dispersion optical waveguide path and said at least one negative dispersion optical waveguide path relative to the transmission direction of said signal light and the wavelength of said pump light is a wavelength in the 980 nm band.

9. An optical amplifier according to claim 1, wherein said least one positive dispersion optical wavelength path is an Er-doped optical fiber in which said dispersion at the wavelength of 1580 nm is equal to or more than 5 ps·nm$^{-1}$·km$^{-1}$.

10. An optical amplifier according to claim 9, wherein the concentration of Er in said Er-doped optical fiber is not less than 1000 ppm and not more than 3000.

11. An optical amplifier according to claim 9, wherein the wavelength of said pump light is a wavelength of the 1480 nm band and at least one optical waveguide path other than said Er-doped optical fiber of said at least one positive dispersion optical waveguide path and said at least two negative dispersion optical waveguide path is disposed upstream of said Er-doped optical fiber relative to the transmission direction of signal light.

12. An optical amplifier according to claim 1, wherein said at least one negative dispersion optical waveguide path is disposed at the most upstream side of said at least one positive dispersion optical waveguide path relative to the transmission direction of said signal light.

13. An optical amplifier according to claim 1, wherein said pump light having a wavelength in the 980 nm band is introduced in said at least one negative dispersion optical waveguide path and said pump light having a wavelength in the 1480 nm band is introduced in said at least one positive dispersion optical waveguide path.

* * * * *